United States Patent
Choi et al.

(10) Patent No.: US 8,433,381 B2
(45) Date of Patent: Apr. 30, 2013

(54) ARRANGEMENT METHOD OF SUPERCONDUCTING WIRES OF A SUPERCONDUCTING CABLE

(75) Inventors: Chang Youl Choi, Gumi-si (KR); Su Kil Lee, Gumi-si (KR); Choon Dong Kim, Gunpo-si (KR); Hyun Man Jang, Hwaseong-si (KR); Keun Tae Lee, Gumi-si (KR); Seok Hern Jang, Gunpo-si (KR); Yang Hoon Kim, Jeonju-si (KR)

(73) Assignee: LS Cable Ltd., Anyang-si, Gyeonggi-do (KR)

( * ) Notice: Subject to any disclaimer, the term of this patent is extended or adjusted under 35 U.S.C. 154(b) by 116 days.

(21) Appl. No.: 13/219,094

(22) Filed: Aug. 26, 2011

(65) Prior Publication Data

US 2012/0214672 A1 Aug. 23, 2012

(30) Foreign Application Priority Data

Feb. 18, 2011 (KR) .......................... 10-2011-0014470
Jul. 4, 2011 (KR) .......................... 10-2011-0065885

(51) Int. Cl.
*H01L 39/24* (2006.01)

(52) U.S. Cl.
USPC .......................................................... 505/231

(58) Field of Classification Search .................. 505/230, 505/231, 431
See application file for complete search history.

(56) References Cited

U.S. PATENT DOCUMENTS 7,394,338 B2* 7/2008 Iwakuma et al. ............. 335/216
7,908,124 B2* 3/2011 Hirose .............................. 703/1

* cited by examiner

*Primary Examiner* — Colleen Dunn
(74) *Attorney, Agent, or Firm* — Lowe Hauptman Ham & Berner, LLP

(57) ABSTRACT

The arrangement method of superconducting wires of a superconducting cable, includes: in a case where a refrigerator is installed at one of terminal structures provided on both sides of a superconducting cable, and a cooling fluid is passed through the superconducting cable by a pump for cooling, setting the numbers of superconducting wires of sections of the superconducting cable installed between the terminal structures on both the sides to be different depending to temperatures of the sections, wherein the numbers of superconducting wires are increased from the section of the superconducting cable having the lowest temperature to the section thereof having the highest temperature while maintaining a current-carrying capability.

5 Claims, 2 Drawing Sheets

ARRANGEMENT METHOD OF SUPERCONDUCTING WIRES OF A SUPERCONDUCTING CABLE

CROSS-REFERENCE TO RELATED APPLICATION

This application claims priority to Korean Patent Application Nos. 2011-14470, filed on Feb. 18, 2011, and 2011-65885, filed on Jul. 4, 2011, and all the benefits accruing therefrom under 35 U.S.C. §119, the contents of which in its entirety are herein incorporated by reference.

BACKGROUND

1. Field

This disclosure relates to an arrangement method of superconducting wires of a superconducting cable, and more particularly, to an arrangement method of superconducting wires of a superconducting cable capable of suitably determining the number of superconducting wires while maintaining a current-carrying capability depending on a temperature deviation of sections of the superconducting cable including the superconducting wires for arrangement of the superconducting wires.

2. Description of the Related Art

Superconducting cables are recently spotlighted as high-density current transmission cables which use properties of superconducting wires in which the resistance drops abruptly at a low temperature (substantially 100K or less in a high-temperature superconductor, and substantially 20K or less in a low-temperature superconductor) and approaches zero.

In such superconducting cables, high-temperature superconducting cables can be easily obtained and maintain superconducting properties using liquid nitrogen which is cheap, and thus they are developed to a significant level. In embodiments of this disclosure, such high-temperature superconducting cables are applied and described.

As illustrated in FIG. 1, a superconducting cable system includes two terminal structures 20 and 30 to which superconducting cable 10 (a line represented as a shaded part in FIG. 1) is connected and a refrigerator 40 provided on the front side of the one terminal structure 20.

The superconducting cable 10 according to the related art is typically manufactured to have a length of 600 m for use. In order to extend the length as needed, a plurality of intermediate pull boxes 11, 12, and 13 are connected.

Moreover, in the superconducting cable system according to the related art, a cooling flow path (a flow path formed between an inner can and an outer can of a vacuum layer and the like) through which a cooling fluid (for example, liquid nitrogen) flows is provided in the superconducting cable 10. In addition, the superconducting cable system is configured to supply the cooling fluid through the one terminal structure 20, discharge the cooling fluid through the other terminal structure 30 to be recovered by a recovery pipe 50, and supply the cooling fluid to the refrigerator 40 again.

Moreover, a pump 42 is installed between the refrigerator 40 and the terminal structure 20 to circulate the cooling fluid through the superconducting cable 10 and the recovery pipe 50.

The superconducting cable 10 is configured of superconducting wires that form a core as conductors. In a case where the superconducting cable 10 has a short length of 600 m, a temperature deviation of sections of the superconducting cable 10 rarely occurs, and thus the same number of superconducting wires is used through the sections.

The superconducting wire has properties of increasing the current-carrying capability when the temperature decreases and decreasing the current-carrying capability when the temperature increases. In general, it is known that the current-carrying capability increases by 8% when the temperature decreases by 1° C.

Therefore, as shown in FIG. 1, for a long distance, in a case where the superconducting cable 10 has a great length (for example, 3,200 m), the temperature of an inlet portion 10a of the superconducting cable 10 connected to the terminal structure 20 provided on the side where the refrigerator 40 is provided is low, and the temperature of an outlet portion 10b of the superconducting cable 10 connected to the terminal structure 30 on the opposite side increases due to heat invasion and heat generated by the conductors as the cooling fluid passes through the superconducting cable 10, resulting in a temperature deviation of sections.

In the superconducting cable 10 according to the related art, depending to a correlation between the superconducting wire and the temperature, the number of superconducting wires is determined by calculating current that the superconducting wires can transmit on the basis of the temperature of the cable side of a section with the lowest current-carrying capability (a section with the highest temperature). Over the entire sections of the superconducting cable for a long distance, similarly to the superconducting cable for a short distance, the same number of superconducting wires is used through the sections.

In other words, the number of superconducting wires that is determined on the basis of the temperature of the cable side of the section on the terminal structure 30 side, which has the highest temperature, is applied through all the sections L1, L2, L3, and L4.

For more specific description, an operation of determining the number of superconducting wires will be described in detail with reference to Table 1 as follows.

TABLE 1

| Temperature (K) | IC Current (A) |
|---|---|
| 77 | 90 |
| 76 | 97.2 |
| 75 | 104.976 |
| 74 | 113.3741 |
| 73 | 122.444 |
| 72 | 132.2395 |
| 71 | 142.8187 |
| 70 | 154.2442 |
| 68 | 166.5837 |
| 67 | 179.9104 |
| 66 | 194.3032 |
| 65 | 209.8475 |

Table 1 shows values calculated through a simulation with temperature on a superconducting wire in a case where the temperature of liquid nitrogen which is a cooling fluid in the atmosphere is 77 K and an IC current is 90 A at this time.

With regard to the performance of the superconducting cable system described with reference to FIG. 1, the length of the superconducting cable 10 is 3,200 m, the carried current is 14,000 A, the temperature of the inlet portion 10a is 65K, and the temperature of the outlet portion 10b is 72K.

In addition, with regard to the temperature of each section of the superconducting cable 10, the temperature of the section L1 (an interval of 800 m from the inlet portion 10a to the intermediate pull box 11) is 66.5K, the temperature of the section L2 (at 1,600 m position from the inlet portion 10a) is 68.5K, the temperature of the section L3 (at 2,400 m position from the inlet portion 10a) is 70.2K, and the temperature of the section L4 (at 3,200 m position from the inlet portion 10a) is 72K.

Therefore, the number of superconducting wires needed for the superconducting cable system according to the related art is as follows.

The number of wires=14,000/132.2395 (the amount of current of a strand of wire at 72K)=105.87, substantially 106 strands are needed.

As shown in FIG. 1, when the number of superconducting wires of the section L4 having the highest temperature is determined as 106 strands, the numbers of superconducting wires of the other sections L1, L2, and L3 are determined as 106 strands.

Consequently, since the numbers of superconducting wires are determined on the basis of the section having the highest temperature, even though the temperature decreases as being closer to the inlet portion 10a of the superconducting cable 10 which has the lowest temperature, the superconducting wires having more strands than necessary are used. The superconducting wires are important to the manufacturing cost of the superconducting cable 10 and thus become causes of an increase in the total cost of the superconducting cable 10. Moreover, there is a problem in that a superconductor connection time is unnecessarily increased due to the more number of superconducting wires than necessary, resulting in degradation of operability.

SUMMARY

This disclosure provides a method of minimizing the number of wires of a superconducting cable without reducing a current-carrying capability of the superconducting cable to reduce the manufacturing cost of the superconducting cable and reducing an operation time to enhance operation efficiency.

In one aspect, there is provided an arrangement method of superconducting wires of a superconducting cable, including: in a case where a refrigerator is installed at one of terminal structures provided on both sides of a superconducting cable, and a cooling fluid is passed through the superconducting cable by a pump for cooling, setting the numbers of superconducting wires of sections of the superconducting cable installed between the terminal structures on both the sides to be different depending to temperatures of the sections, wherein the numbers of superconducting wires are increased from the section of the superconducting cable having the lowest temperature to the section thereof having the highest temperature while maintaining a current-carrying capability.

In another aspect, there is provided an arrangement method of superconducting wires of a superconducting cable, including: in a case where refrigerators are respectively installed at terminal structures provided on both sides of a superconducting cable, and a cooling fluid is passed through the superconducting cable by a pump for cooling, setting the numbers of superconducting wires of sections of the superconducting cable on both the terminal structures sides to be equal, and setting the numbers of superconducting wires of sections excluding the sections of the superconducting cable on both the terminal structures sides to be smaller than those of the number of superconducting wires of the sections of the superconducting cable on both the terminal structures sides.

The numbers of superconducting wires arranged in the other sections excluding the sections of the superconducting cable on both the terminal structures sides are set to be equal through the sections.

In still another aspect, there is provided an arrangement method of superconducting wires of a superconducting cable, including: in a case where a refrigerator is installed between terminal structures provided on both sides of a superconducting cable, and circulation lines are configured by connecting two recovery pipes and causing cooling fluids to be separately circulated through a stop joint by respective pumps, setting the numbers of superconducting wires of sections of the superconducting cable to be different in the circulation lines, wherein the numbers of superconducting wires are set to be smaller as the sections are closer to the refrigerator from the terminal structures.

In further another aspect, there is provided an arrangement method of superconducting wires of a superconducting cable, including: in a case where refrigerators are respectively installed at terminal structures provided on both sides of a superconducting cable in which two cooling flow paths are formed, setting the numbers of superconducting wires of sections of the superconducting cable on both the terminal structures sides to be smaller than those of other sections excluding the sections of the superconducting cable on both the terminal structures sides.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Figure 1:
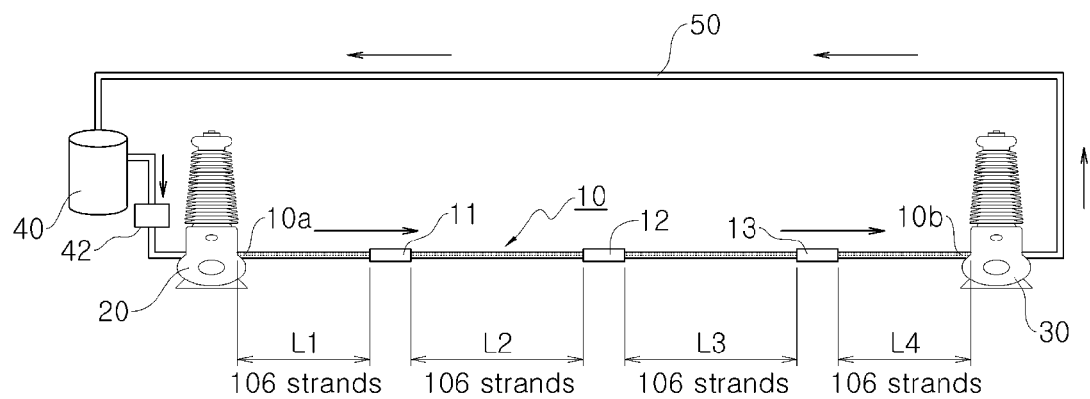
FIG. 1 is an explanatory view showing a connection relationship of a superconducting cable according to related art.

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements. The shape, size and regions, and the like, of the drawing may be exaggerated for clarity.

Like elements the same as those according to the related art are denoted by like reference numerals, and for the convenience of description, like elements which are similar to those according to the related art are also denoted by like reference numerals.

Figure 2:
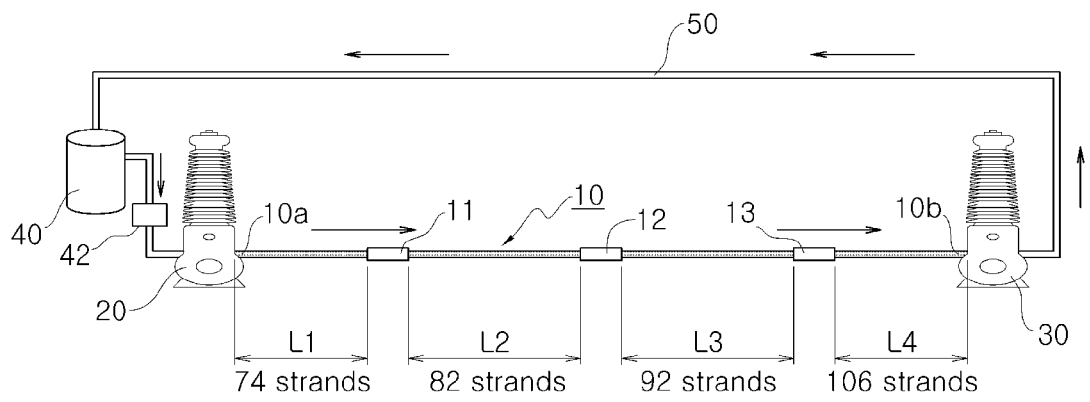
FIG. 2 is an explanatory view showing a connection relationship of a superconducting cable system according to an embodiment.

FIG. 2 is an explanatory view showing a connection relationship of a superconducting cable system according to an embodiment. As shown in FIG. 2, a superconducting cable 10 is connected between terminal structures 20 and 30 which are provided on both sides at an interval, and through sections L1 to L4 of the superconducting cable 10, the number of superconducting wires is reduced from the section having the highest temperature to the section having the lowest temperature.

For example, when the number of superconducting wires of the section L4 on an outlet portion 10b side of the superconducting cable 10 which has the highest temperature is set to 106 strands, the section L3 may have 92 strands, the section L2 may have 82 strands, and the section L1 may have 74 strands.

Figure 3:
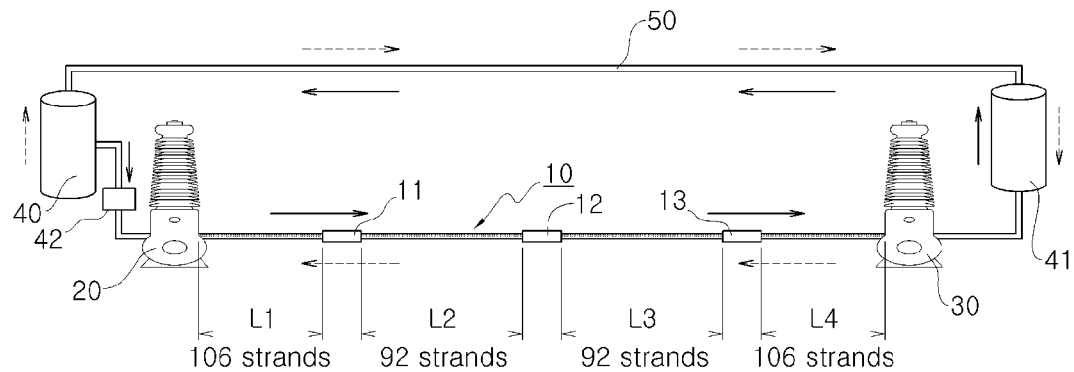
FIG. 3 is an explanatory view showing a connection relationship of a superconducting cable system according to another embodiment.

FIG. 2 shows a case where a refrigerator 40 is provided only for the one terminal structure 20. However, in another embodiment, as shown in FIG. 3, in a case where two refrigerators 40 and 41 are installed, the one refrigerator 40 which is being operated is referred to as a normal state, the number of superconducting wires is determined as described with reference to FIG. 2. Accordingly, a cooling fluid flows in the solid arrow direction as the one refrigerator 40 is operated.

If the one refrigerator 40 has broken down, the other refrigerator 41 is operated. In this case, the flow of the cooling fluid is reversed (in the dotted arrow direction).

In other words, in consideration of the operated states of the refrigerators 40 and 41, since the cooling temperatures of the sections close to the refrigerators 40 and 41 may be set to be highest as one of both the refrigerators 40 and 41 has broken down, the numbers of superconducting wires of those sections are set to be highest, and the numbers of superconducting wires of the sections therebetween are set to be relatively low.

Under this condition, the numbers of superconducting wires of the sections of the superconducting wire 10, for example, are 106 strands in the sections L1 and L4 and are 92 strands in the sections L2 and L3.

In cases where the superconducting cable 10 is constructed to have a significantly long length, in consideration of easy manufacturing and transportation, divided sections for the superconducting cable 10 are manufactured and are connected through intermediate pull boxes 11, 12, and 13 to extend the length of the superconducting cable 10.

Therefore, a needed number of superconducting wires is set for each section depending to a temperature aspect to manufacture the superconducting cable, so that the total number of superconducting wires can be reduced while maintaining an amount of current carried.

Figure 4:
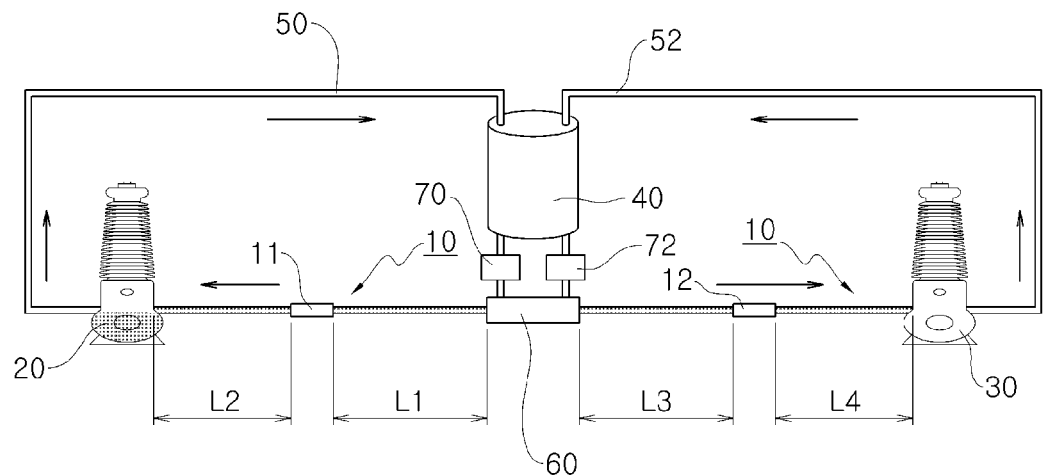
FIG. 4 is an explanatory view showing a connection relationship of a superconducting cable system according to still another embodiment.

In still another embodiment, as shown in FIG. 4, a configuration, in which one refrigerator 40 is positioned at the center, two recovery pipes 50 and 52 are connected to the refrigerator 40 to form individual circulation lines, and in addition to the intermediate pull boxes 11 and 12, a stop joint 60 is provided on the superconducting cable 10 to cause the cooling fluid output from the refrigerator 40 to separately flow, is provided in order to form two cooling circulation lines.

Pumps 70 and 72 are provided in the pipes formed between the refrigerator 40 and the stop joint 60.

The stop joint 60 is connected to the refrigerator 40 with the two pipes and has a structure in which a partition is installed in an inner central part of the stop joint 60 so that the cooling fluid that flows into the stop joint 60 through the pipes independently and separately circulates and moves. In other words, the stop joint 60 has a structure in which two independent circulation lines through which the cooling fluid moves are equipped.

Therefore, the cooling fluid on the recovery pipe 50 side is circulated clockwise, and the cooling fluid on the recovery pipe 52 side is circulated counterclockwise.

In addition, in FIG. 4, the numbers of superconducting wires of the sections L1, L2, L3, and L4 of the superconducting cable 10 are different in left and right circulation lines. When the cooling fluid that is cooled in the refrigerator 40 and passes through the stop joint 60 flows to the superconducting cable 10, the temperature of the cooling fluid in the sections L1 and L3 is lower than that in the sections L2 and L4, and thus the number of superconducting wires of the sections L1 and L3 is set to be smaller than that of the sections L2 and L4.

Figure 5:
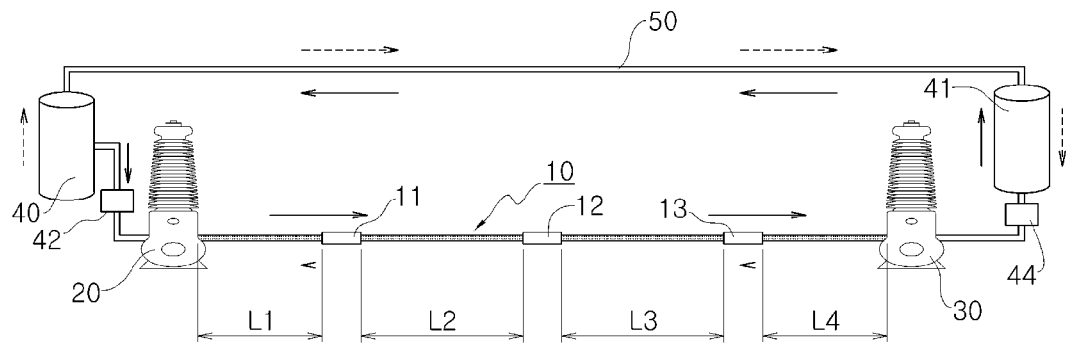
FIG. 5 is an explanatory view showing a connection relationship of a superconducting cable system according to further another embodiment.

As shown in FIG. 5, a different structure of the superconducting cable 10, in other words, a superconducting cable 10 in which the inside of a former is formed in a hollow type and thus two cooling flow paths are included may also be applied, as well as the cooling flow path of the superconducting cable 10 through which the cooling fluid flows.

The superconducting cable 10 having the two flow paths shown in FIG. 5 is useful to a case where a voltage level is high. As the voltage level is higher, an insulating layer inside the superconducting cable 10 has to be thickened. Therefore, in the case of the superconducting cable 10 having this structure, the cooling fluid is cooled by the two refrigerators 40 and 41. Here, the refrigerators 40 and 41 are all in the operated state, and pumps 42 and 44 are installed in the respective refrigerators 40 and 41, so that the cooling fluids are circulated through the two cooling flow paths.

Therefore, in the solid arrow direction, the cooling fluid passes through the hollow flow path inside the former layer of the superconducting cable 10, and in the dotted arrow direction displayed as the opposite direction to the solid arrow direction, as described above with reference to FIGS. 2 and 3, the cooling fluid passes through the flow path of the superconducting cable 10 (the flow path formed between the inner can and the outer can of the vacuum layer).

In the case of the superconducting cable 10 in which the cooling fluids flow in the opposite directions inside the superconducting cable 10 through the two cooling flow paths and the voltage level is high, the temperature of the superconducting cable 10 can be sufficiently decreased.

Even in this case, the numbers of superconducting wires of the sections L1, L2, L3, and L4 are set to be different. Specifically, the numbers of superconducting wires of the sections L1 and L4 close to the refrigerators 40 and 41 are smaller than those of the sections L2 and L3 therebetween.

However, the numbers of superconducting wires of the sections L1 and L4 are not equal to each other.

According to the present disclosure, the numbers of superconducting wires are suitably determined depending on the temperatures of the sections of the superconducting cable, so that the numbers of superconducting wires of the superconducting cable can be minimized without reducing the current-carrying capability of the superconducting cable, thereby significantly reducing the manufacturing cost of the superconducting cable.

Moreover, according to the present disclosure, an unnecessary number of superconducting wires can be reduced, so that a problem in that a conductor connection operation time is lengthened as an unnecessary number of superconducting wires has to be set as in the related art can be solved.

While the exemplary embodiments have been shown and described, it will be understood by those skilled in the art that various changes in form and details may be made thereto without departing from the spirit and scope of this disclosure as defined by the appended claims.

In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

What is claimed is:

1. An arrangement method of superconducting wires of a superconducting cable, comprising:
   in a case where a refrigerator is installed at one of terminal structures provided on both sides of a superconducting cable, and a cooling fluid is passed through the superconducting cable by a pump for cooling, setting the numbers of superconducting wires of sections of the superconducting cable installed between the terminal structures on both the sides to be different depending to temperatures of the sections,
   wherein the numbers of superconducting wires are increased from the section of the superconducting cable having the lowest temperature to the section thereof having the highest temperature while maintaining a current-carrying capability.

2. An arrangement method of superconducting wires of a superconducting cable, comprising:
   in a case where refrigerators are respectively installed at terminal structures provided on both sides of a superconducting cable, and a cooling fluid is passed through the superconducting cable by a pump for cooling, setting the numbers of superconducting wires of sections of the superconducting cable on both the terminal structures sides to be equal, and setting the numbers of superconducting wires of sections excluding the sections of the superconducting cable on both the terminal structures sides to be smaller than those of the number of superconducting wires of the sections of the superconducting cable on both the terminal structures sides.

3. The arrangement method of superconducting wires of a superconducting cable according to claim 2, wherein the numbers of superconducting wires arranged in the other sections excluding the sections of the superconducting cable on both the terminal structures sides are set to be equal through the sections.

4. An arrangement method of superconducting wires of a superconducting cable, comprising:
   in a case where a refrigerator is installed between terminal structures provided on both sides of a superconducting cable, and circulation lines are configured by connecting two recovery pipes and causing cooling fluids to be separately circulated through a stop joint by respective pumps, setting the numbers of superconducting wires of sections of the superconducting cable to be different in the circulation lines,
   wherein the numbers of superconducting wires are set to be smaller as the sections are closer to the refrigerator from the terminal structures.

5. An arrangement method of superconducting wires of a superconducting cable, comprising:
   in a case where refrigerators are respectively installed at terminal structures provided on both sides of a superconducting cable in which two cooling flow paths are formed, setting the numbers of superconducting wires of sections of the superconducting cable on both the terminal structures sides to be smaller than those of other sections excluding the sections of the superconducting cable on both the terminal structures sides.

* * * * *